(12) United States Patent
Jung et al.

(10) Patent No.: US 8,182,354 B2
(45) Date of Patent: May 22, 2012

(54) SLIP JOINT OF STEERING APPARATUS FOR VEHICLE

(75) Inventors: Young-sock Jung, Wonju (KR);
Jung-sik Park, Wonju (KR);
Young-moon Park, Wonju (KR)

(73) Assignee: Mando Corporation, Gyeonggi-Do (KR)

( * ) Notice: Subject to any disclaimer, the term of this patent is extended or adjusted under 35 U.S.C. 154(b) by 457 days.

(21) Appl. No.: 12/291,773

(22) Filed: Nov. 13, 2008

(65) Prior Publication Data
US 2009/0143151 A1    Jun. 4, 2009

(30) Foreign Application Priority Data

| Dec. 3, 2007 | (KR) | ......................... 10-2007-0124360 |
| Feb. 4, 2008 | (KR) | ......................... 10-2008-0011284 |
| Sep. 18, 2008 | (KR) | ......................... 10-2008-0091573 |
| Sep. 26, 2008 | (KR) | ......................... 10-2008-0094781 |

(51) Int. Cl.
*F16C 3/03* (2006.01)
*F16D 3/06* (2006.01)

(52) U.S. Cl. ..................................................... 464/167
(58) Field of Classification Search .................. 464/162, 464/167; 384/48–51
See application file for complete search history.

(56) References Cited

U.S. PATENT DOCUMENTS

| 2,400,374 | A | * | 5/1946 | Selnes ............................... 384/49 |
| 2,651,552 | A | * | 9/1953 | Pitner ............................... 384/51 |
| 4,176,888 | A | * | 12/1979 | Teramachi .................... 464/167 |
| 4,701,059 | A | * | 10/1987 | Yokota .............................. 384/51 |
| 6,705,648 | B1 | * | 3/2004 | Maruyama et al. ........... 464/167 |
| 2003/0232656 | A1 | * | 12/2003 | Dutkiewicz et al. .......... 464/167 |
| 2007/0082743 | A1 | * | 4/2007 | Park | |
| 2008/0254902 | A1 | * | 10/2008 | Jung | |

FOREIGN PATENT DOCUMENTS

| FR | 1373752 | * 10/1964 | .................... 464/167 |
| JP | 57-190119 | 11/1982 | |
| JP | 03-022128 | 3/1991 | |
| JP | 10-318274 | 12/1998 | |
| JP | 2006-177517 | 7/2006 | |
| JP | 2007-106402 | 4/2007 | |
| WO | WO 2004/062981 | 7/2004 | |

OTHER PUBLICATIONS

Japanese Office Action, with English translation, issued in Japanese Patent Application No. 2008-303902, mailed Mar. 1, 2011.

* cited by examiner

*Primary Examiner* — Gregory Binda
*Assistant Examiner* — Josh Skroupa
(74) *Attorney, Agent, or Firm* — McDermott Will & Emery LLP

(57) ABSTRACT

A slip joint of a steering apparatus for a vehicle, the slip joint including: an outer member having a plurality of first assembling recesses; an inner member being inserted within the outer member and having a plurality of second assembling recesses; and a slip bush, which is inserted between the outer member and the inner member and has mounting parts, into which balls and rollers are inserted, and elastic parts having one side cut out in an axial direction, each mounting part having a plurality of first mounting holes and a plurality of second mounting holes. Each elastic part transfers power while compensating for clearance even when the balls disposed between the inner member and the outer member of the slip joint are worn away so that a rattling noise generated due to clearance is removed, and steering stability and durability of the slip joint can be improved.

9 Claims, 12 Drawing Sheets

SLIP JOINT OF STEERING APPARATUS FOR VEHICLE

TECHNICAL FIELD

The present disclosure relates to a slip joint of a steering apparatus for a vehicle.

More particularly, the embodiments of the invention relates to a slip joint of a steering apparatus for a vehicle, in which an elastic part transfers power while compensating for clearance even when a ball disposed between an inner member and an outer member of a slip joint is worn away or damaged due to abrasion, so that a rattling noise generated due to clearance is removed, and steering stability and durability of the slip joint can be improved by increasing torsional rigidity of a slip bush.

Also, the ball makes contact with four points within the slip bush so as to decrease frictional force, and the slip bush can smoothly slide even if the ball is deformed.

BACKGROUND ART

In a steering apparatus for a vehicle, if a driver rotates a steering wheel in a desired direction, a steering shaft connected to the steering wheel rotates. Accordingly, the steering shaft delivers rotational force to a gear box including a rack-pinion gear through a universal joint and a slip joint.

At this time, the gear box converts the rotational movement of the steering shaft to a linear movement through the rack-pinion gear so as to transfer it to a rack bar. The rack bar transfers force to a tie rod connected to a knuckle of a tire so as to allow change of the drive direction of a vehicle.

Particularly, a shaft positioned between the steering shaft and the gear-box has a structure where input and output shafts are slanted with respect to each other at a predetermined angle, and are not positioned on the same axis. This is because a typical type shaft assembling structure can not transfer power. Therefore, it is necessary to use a universal joint allowing the structure where a steering shaft can be slanted at a predetermined angle.

FIG. 1 is a schematic side view of a steering apparatus using a typical universal joint. Generally, when the lower end of a steering shaft 210 is connected with a gear box 260 in a steering system of a vehicle, it is required for the steering shaft to be connected with the gear box in a state where the steering shaft is slanted at a certain angle in consideration of peripheral conditions. Therefore, the steering system uses a universal joint 100 so as to satisfy such a condition.

Herein, the term 'the universal joint' 100 is used as a common term designating a member which includes an outer member 122, the inner member 124, etc. and transfers rotational force even in a state where the member is bent at a predetermined angle.

The universal joint 100 is a device which has one side coupled with a steering shaft 210 assembled with a steering wheel 270 and the other side coupled with a gear box 260 so as to transfer rotational force generated in the steering wheel 270 to wheels of a vehicle through the gear box 260.

A steering column 250 includes the outer tube 230, the inner tube 220 and a mounting bracket 240. The outer tube 230 is formed in a direction of the steering wheel 270, and has the inner tube 220 inserted into the outer tube. The inner tube 220 has a diameter smaller than the diameter of the outer tube 230 so that the inner tube can be inserted within the interior of the outer tube when impact is exerted thereto. The outer tube 230 and the inner tube 220 are hollow and are formed in a tube-shape so as to allow the steering shaft 210 to smoothly rotate.

FIG. 2 is a perspective view of a conventional universal joint of a steering apparatus for a vehicle. FIG. 3 is a sectional view of a conventional slip joint of a steering apparatus for a vehicle.

As shown in FIGS. 2 and 3, the conventional universal joint 100 includes yoke joints 110, which transfer rotational force, even in a state of they are bent at a predetermined angle, and a slip joint 120, which transfers the rotational force transferred from one of the yoke joints 110, which is installed at one side of the slip joint, to the other yoke joint 110 installed at the other side thereof and simultaneously can be extended and contracted in an axial direction.

Each yoke joint 110 includes two yokes 130 and one spider 140. The slip joint 120 allows the shaft to be extended and contracted by force applied in an axial direction while transferring rotational force of the shaft. The slip joint 120 has an outer member 122 having a hollow-shape, an inner member 124 inserted into the outer member 122 so as to absorb force applied in a longitudinal direction, and a ball 150 disposed between the outer member 122 and the inner member 124.

The outer member 122 has a hollow interior, and the inner member 124 having a shape of a circular rod is connected with the outer member in such a manner that it is inserted within the outer member 122. Each guide recess 160 is formed at both sides of the inner circumferential surface of the outer member 122 in such a manner that the guide recess is formed along an axial direction while having a long shape, in order to allow the ball 150 to move together with the inner member 124 when a slip operation where the inner member 124 retracts into or protracts from the outer member 122 is performed after the ball 150 is inserted between the inner member and the outer member.

The inner member 124 has one side connected with the yoke joint 110 and the other side assembled with the outer member 122 so that the inner member transfers rotational force and is simultaneously inserted within the outer member 122, thereby absorbing load applied in a longitudinal direction between an input shaft and an output shaft while slipping in an axial direction.

Each guide recess 170 is formed at a position of the outer circumferential surface of the inner member 124, which corresponds to the guide recess 160, in a longitudinal direction so as to allow the ball 150 inserted with the guide recess 160 to stably and smoothly move.

The ball 150 is inserted between the outer member 122 and the inner member 124 in such a manner that the ball makes close contact with the guide recess 160 and the guide recess 170, and slips under rolling friction. At this time, as the inner member 124 rotates, the outer member 122 rotates together with the inner member so that rotational force from the input shaft is transferred to the output shaft.

However, the conventional universal joint 100 of a steering apparatus for a vehicle has a problem in that when bending force or torsion force generated due to large load exerted from the outside is applied to the universal joint 100, the ball 150 disposed between the outer member 122 and the inner member 124 rotates while receiving the load. As a result, a deformation phenomenon where the ball 150 is damaged or deteriorated occurs so that the ball can not smoothly transfer rotational force of the input shaft. Also, because the ball disposed between the guide recess 160 and the guide recess 170 is worn away due to frequent friction, etc., clearance is generated so that a rattling noise is generated.

In addition, in the conventional universal joint 100 of a steering apparatus for a vehicle, the guide recess 160 and the guide recess 170 have a semi-circular section where a radius of curvature is equal in whole part so that each surface of the guide recess 160 and the guide recess 170 makes linear contact with the spherical surface of the ball 150, thereby generating larger frictional resistance. Because of deformation of the outer member 122 or the inner member 124, which is generated because errors occur in manufacturing measurement, or the straightness degree is changed, there is a problem in that smooth rotation of the ball 150 is obstructed so that a sliding performance is changed.

DISCLOSURE OF INVENTION

Accordingly, the present disclosure provides a slip joint of a steering apparatus for a vehicle, in which an elastic part transfers power while compensating for clearance even when a ball disposed between an inner member and an outer member of a slip joint is worn away or damaged due to abrasion, so that a rattling noise generated due to clearance is removed, and steering stability and durability of the slip joint can be improved by increasing torsional rigidity of a slip bush.

Also, the present disclosure provides a slip joint of a steering apparatus for a vehicle, in which a ball received in a slip bush makes contact with four points within a hole or recess instead of making linear contact therewith so as to reduce frictional resistance, thereby improving assembling efficiency of the slip bush and sufficiently absorbing external displacement, and even when deformation is generated due to occurrence of errors in manufacturing measurement or the change of a straightness degree, the slip bush can smoothly slide.

In accordance with a first embodiment of the present invention, there is provided a slip joint of a steering apparatus for a vehicle, the slip joint including: an outer member having a plurality of first assembling recesses formed on an inner circumferential surface of the outer member in an axial direction; an inner member being inserted within the outer member, the inner member having a plurality of second assembling recesses formed on an outer circumferential surface of the inner member in an axial direction; and a slip bush, which has a hollow cylindrical shape and is inserted between the outer member and the inner member, including mounting parts having balls and rollers inserted within the mounting parts to transfer steering force, and elastic parts having a hollow cylindrical shape and having one side cut out in an axial direction, each mounting part being formed in a long shape along an axial direction and having a plurality of first mounting holes and a plurality of second mounting holes, the first mounting holes extending through outer and inner circumferential surfaces of the mounting part so as to allow the balls to be pressed and inserted into the first mounting holes, the second mounting holes extending through the outer and inner circumferential surfaces of the mounting part so as to allow the rollers to be pressed and inserted into the second mounting holes.

Also, in accordance with a second embodiment of the present invention, there is provided a slip joint of a steering apparatus for a vehicle, the slip joint including: an outer member having a plurality of first assembling recesses formed on an inner circumferential surface of the outer member in an axial direction; an inner member being inserted within the outer member, the inner member having a plurality of second assembling recesses formed on an outer circumferential surface of the inner member in an axial direction; and a slip bush, which has a hollow cylindrical shape and is inserted between the outer member and the inner member, including mounting parts being formed in a long shape along an axial direction and having balls pressed and inserted into the mounting parts while extending through outer and inner circumferential surfaces of the mounting parts, and elastic parts having a hollow cylindrical shape and having one side cut out in an axial direction, at least one of the elastic parts including a cutting part formed at least one portion of the elastic part in the axial direction.

Also, in accordance with a third embodiment of the present invention, there is provided a slip joint of a steering apparatus for a vehicle, the slip joint including: an outer member having a plurality of first assembling recesses formed on an inner circumferential surface of the outer member in an axial direction, and protrusions being formed in the axial direction while protruding from the inner circumferential surfaces of the first assembling recesses; an inner member being inserted within the outer member, the inner member having a plurality of second assembling recesses formed on an outer circumferential surface of the inner member in the axial direction; and a slip bush, which has a hollow cylindrical shape and is inserted between the outer member and the inner member, including elastic parts having a hollow cylindrical shape and having parts cut out in the axial direction correspondingly to the protrusions so as to allow the protrusions of the outer member to be inserted through the cut-out parts, and balls being pressed and inserted into the slip bush while extending through outer and inner circumferential surfaces of the slip bush.

Also, in accordance with a fourth embodiment of the present invention, there is provided a slip joint of a steering apparatus for a vehicle, the slip joint including: an outer member having a plurality of first assembling recesses formed on an inner circumferential surface of the outer member in an axial direction; an inner member being inserted within the outer member, the inner member having a plurality of second assembling recesses formed on an outer circumferential surface of the inner member in the axial direction, and protrusions being formed in the axial direction while protruding from inner circumferential surfaces of the second assembling recesses; and a slip bush, which has a hollow cylindrical shape and is inserted between the outer member and the inner member, including elastic parts having a hollow cylindrical shape and having parts cut out in the axial direction corresponding to the protrusions so as to allow the protrusions of the inner member to be inserted through the cut-out parts, and balls being pressed and inserted into the slip bush while extending through outer and inner circumferential surfaces of the slip bush.

It is preferable that each ball makes contact with four points within the first assembling recesses of the outer member and the second assembling recesses of the inner member.

BRIEF DESCRIPTION OF DRAWINGS

The above and other objects, features and advantages of the present disclosure will be more apparent from the following detailed description taken in conjunction with the accompanying drawings, in which.

BEST MODE FOR INVENTION

Figure 1:
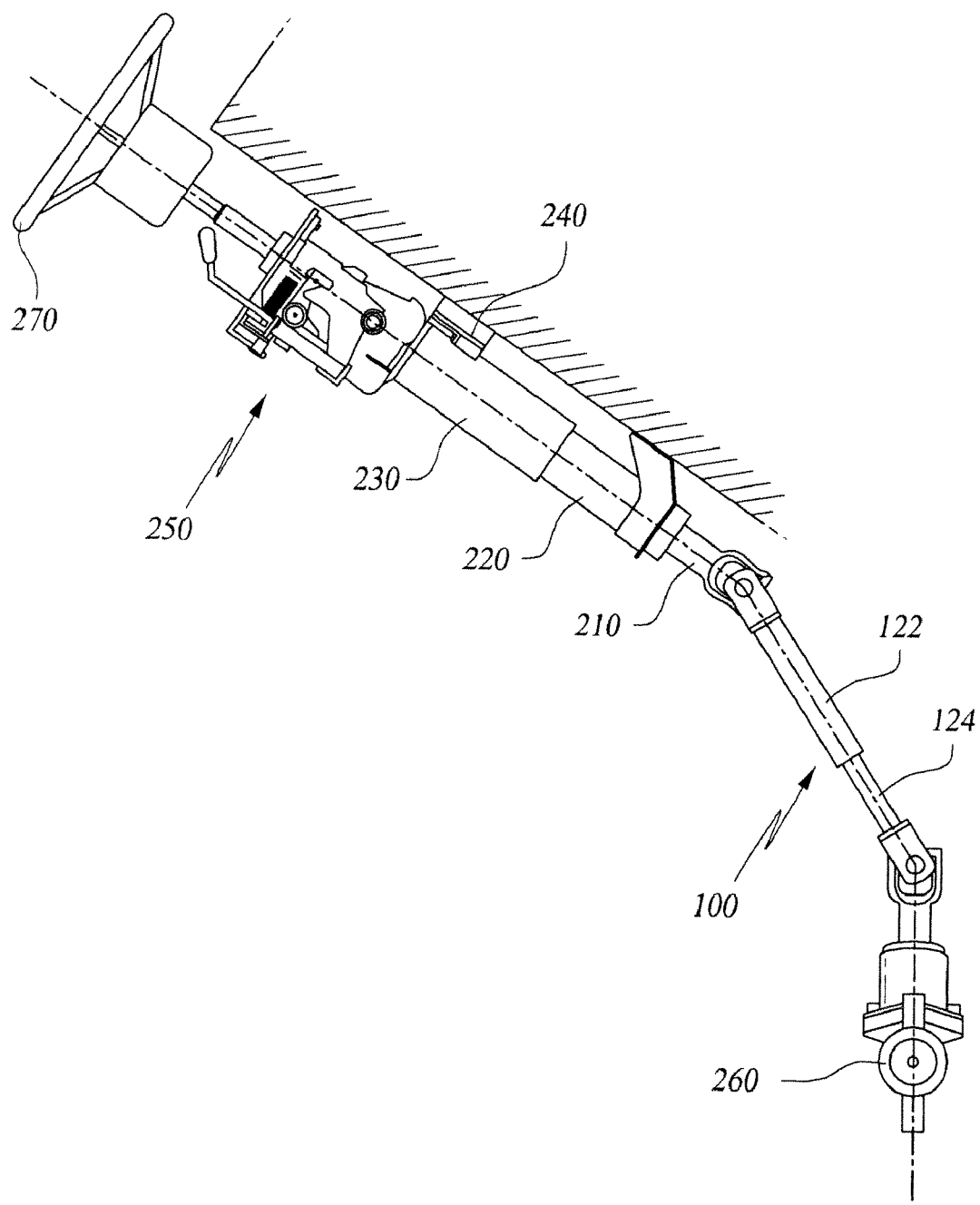
FIG. 1 is a schematic side view of a steering apparatus using a typical universal joint.
Figure 2:
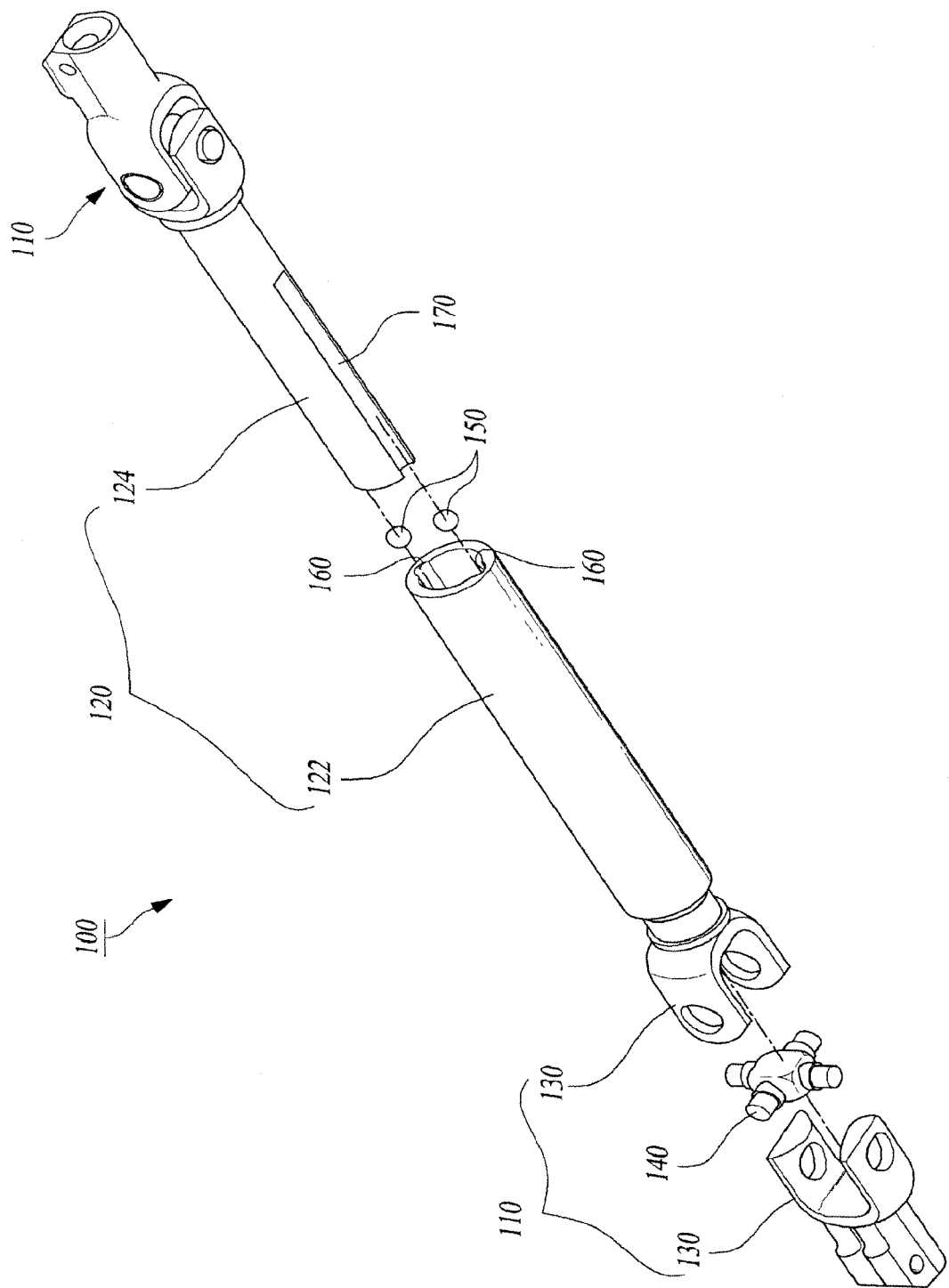
FIG. 2 is a perspective view of a conventional universal joint of a steering apparatus for a vehicle.
Figure 3:
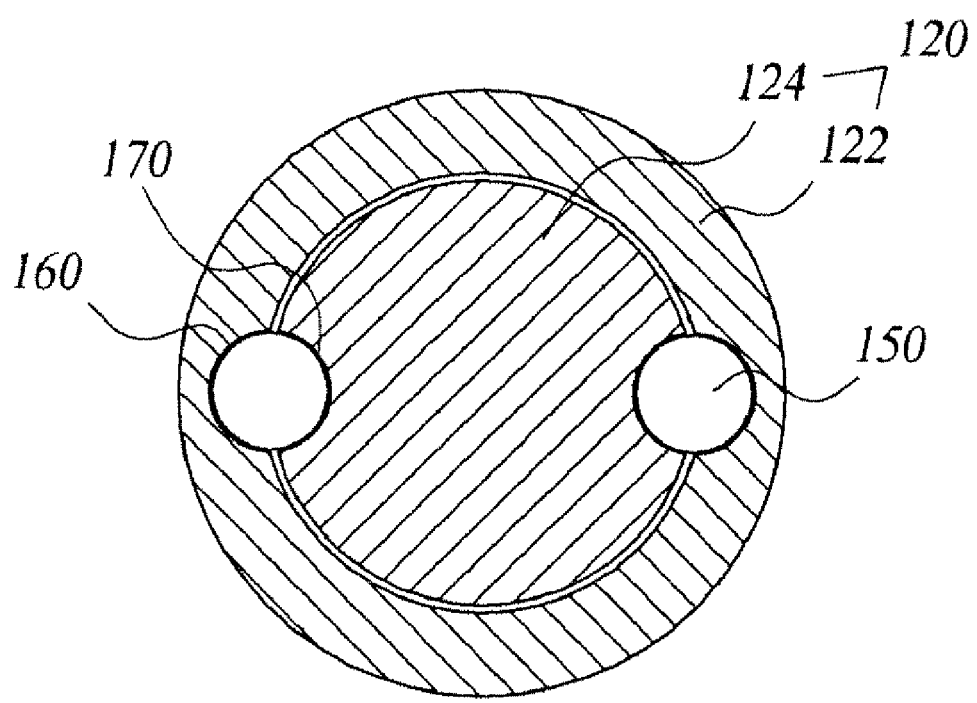
FIG. 3 is a sectional view of a conventional slip joint of a steering apparatus for a vehicle.

Hereinafter, exemplary embodiments of the present invention will be described with reference to the accompanying drawings. In the following description and drawings, the same reference numerals are used to designate the same or similar components, and so repetition of the description on the same or similar components will be omitted. Furthermore, a detailed description of known functions and configurations incorporated herein will be omitted when it may obscure the subject matter of the present invention.

Figure 4A:
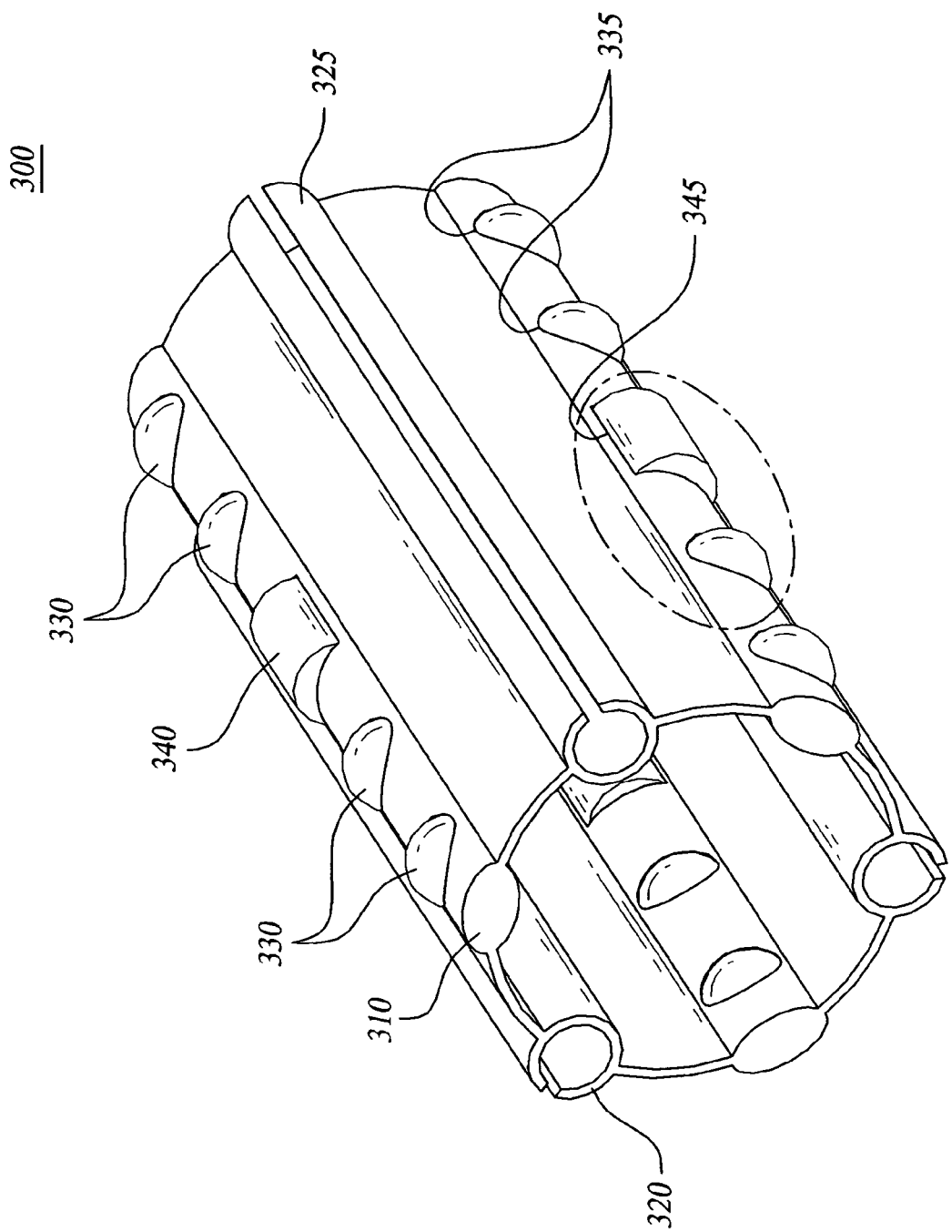
FIGS. 4a and 4b are a perspective view and an enlarged sectional view of a slip bush used in a slip joint of a steering apparatus for a vehicle according to the first embodiment of the present invention.
Figure 4B:
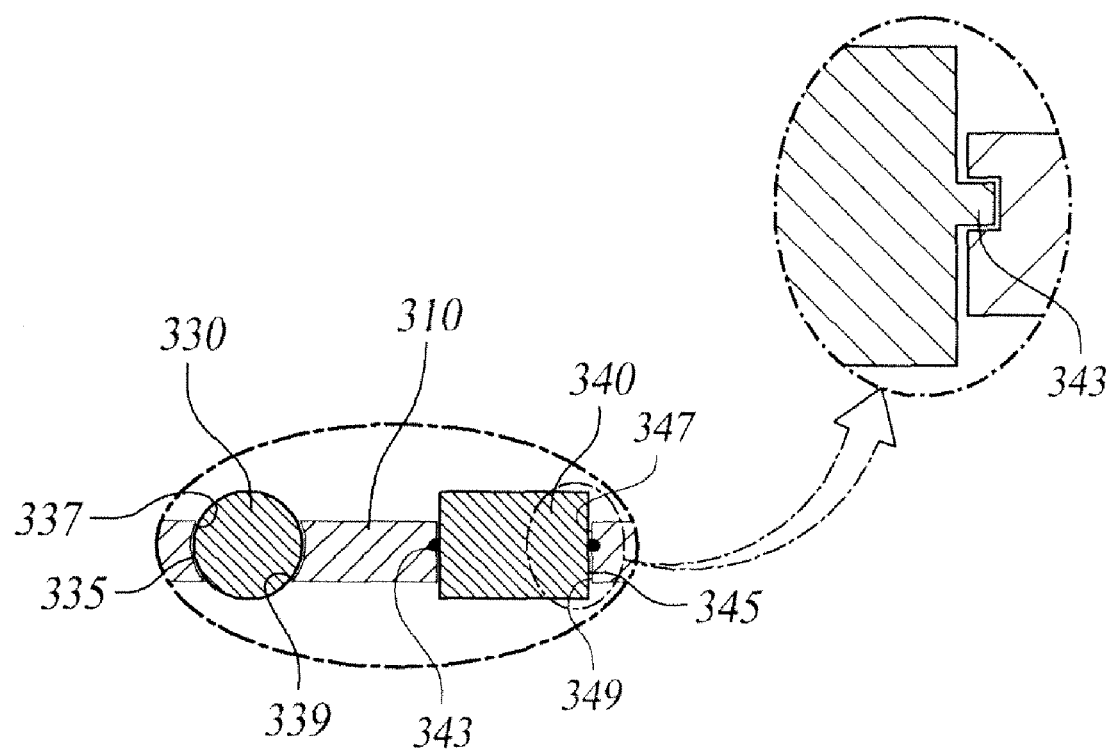
Figure 5:
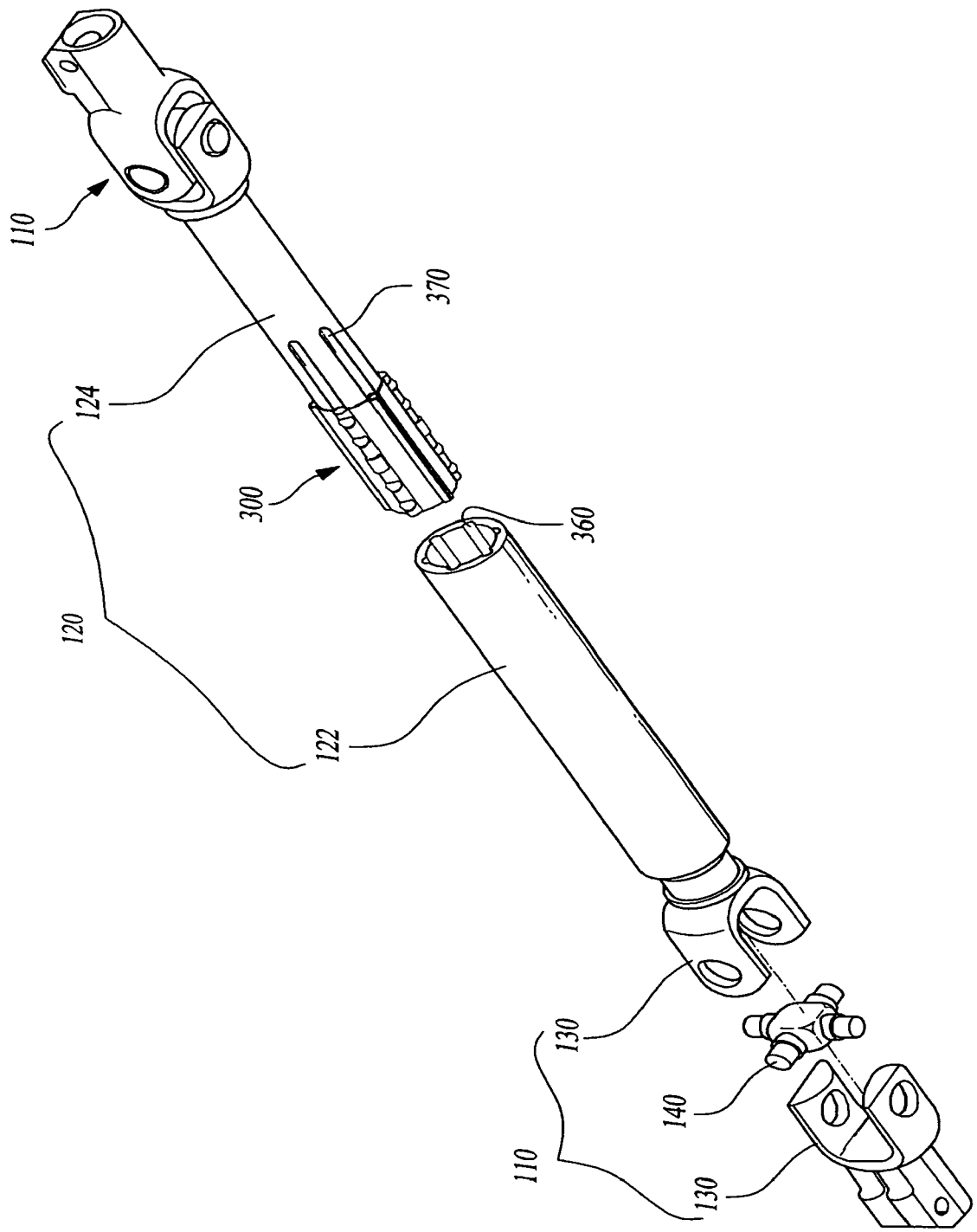
FIG. 5 is an exploded perspective view of a slip joint of a steering apparatus for a vehicle according to the first embodiment of the present invention.

FIGS. 4a and 4b are a perspective view and an enlarged sectional view of a slip bush used in a slip joint of a steering apparatus for a vehicle according to the first embodiment of the present invention, and FIG. 5 is an exploded perspective view of a slip joint of a steering apparatus for a vehicle according to the first embodiment of the present invention.

As shown in FIGS. 4a to 5, a slip joint 120 of a steering apparatus for a vehicle according to the first embodiment of the present invention includes an outer member 122, an inner member 124 and a slip bush 300.

The outer member 122 has a hollow interior and has one side connected to the yoke joint 110. A plurality of first assembling recesses 360 are formed on the inner circumferential surface of the outer member in an axial direction.

The inner member 124 has one side connected with the yoke joint 110 and the other side inserted within the outer member 122. A plurality of second assembling recesses 370 are formed on an outer circumferential surface of the inner member 124 in an axial direction.

The slip bush 300 has a hollow cylindrical shape, and a plurality of mounting parts 310 and a plurality of elastic parts 320 are formed on the slip bush by turns in such a manner that they are spaced a predetermined distance from each other. The slip bush 300 is inserted between the outer member 122 and the inner member 124 so as to transfer steering force when a user performs a steering operation.

The slip bush 300 is made from nylon or plastic material, which has rigidity and an abrasion-proof property. Balls 330 and rollers 340 are inserted into each mounting part 310 so as to allow slip movement to be performed in an axial direction while transferring steering force. Each elastic part 320 having an opened side is contracted and inserted between the first assembling recess 360 of the outer member 122 and the second assembling recess 370 of the inner member 124 so that the elastic part is assembled with the outer member 122 and the inner member 124 without clearance while it is restored by elastic force.

Each mounting part 310 is formed on the slip bush 300, which has a hollow cylindrical shape, in an axial direction while having a long shape. The mounting parts 310 have a circular or elliptical bar-shape and are spaced a predetermined distance from each other in a circumferential direction. Also, a plurality of first mounting holes 335 and second mounting holes 345, which extend through outer and inner circumferential surfaces of the mounting part 310, is formed at each mounting part 310.

Each first mounting hole 335 has a spherical shape so as to allow the ball 330 to be pressed and inserted into the first mounting hole. In order to fix the ball 330 after it has been pressed and inserted from the outer circumferential surface of the mounting part 310, the first mounting hole has a first outer circumference hole 337 of a large size, which extends through the outer circumferential surface of the mounting part, and a first inner circumference hole 339 of a small size, which extends through the inner circumferential surface thereof.

That is, after the ball 330 is pressed and inserted into the first mounting hole 335, the ball 330 protrudes out of the outer circumferential surface and the inner circumferential surface of the mounting part 310 so that the ball performs rolling frictional movement through point-contact while making contact with the first assembling recess 360 and the second assembling recess 370.

The second mounting hole 345 has a long cylindrical shape formed along an axial direction so as to allow the roller 340 of a cylindrical shape to be pressed and inserted therein. Similarly to the first mounting hole 335, the second mounting hole has a second outer circumference hole 347 of a large size, which extends through the outer circumferential surface of the mounting part, and a second inner circumference hole 349 of a small size, which extends through the inner circumferential surface of the mounting part. Therefore, after the roller 340 is pressed and inserted in the second mounting hole 345, the roller 340 protrudes out of the outer and inner circumferential surfaces of the mounting part 310.

Moreover, a recess is additionally formed at both sides of the second mounting hole 345 in the axial direction, and each boss 343 is formed at both sides of the roller 340 in such a manner that it protrudes therefrom. Therefore, it is possible that the boss 343 is pressed and inserted into the recess, and the roller 340 is supported by inner walls of the second mounting hole 345 while rotating about the boss 343 as an axis.

The ball 330 and the roller 340 are typically made from steel, and they can be also made from engineering plastics, such as polyamide or polyacetal, etc., having rigidity and an abrasion-proof property.

The ball 330 of a spherical shape is pressed and inserted into the first mounting hole 335 of the slip bush 300, and the roller 340 of a cylindrical shape is pressed and inserted into the second mounting hole 345 of the slip bush 300. The ball and the roller transfer steering force between the inner member 124 and the outer member 122.

However, the diameter of the roller 340 of a cylinder shape is smaller than the diameter of the ball 330 of a spherical shape. In an early stage, only the ball 330 transfers steering force while making contact with the outer member 122 and the inner member 124. When the ball is worn away due to abrasion progressing to a certain degree so that the diameter of the ball 330 becomes a diameter similar to the diameter of the roller 340, from this time, the roller 340 also transfers steering force while making linear contact with or face contact with the outer member 122 and the inner member 124, similarly to the ball 330.

Therefore, the roller 340 compensates for a phenomenon that, after abrasion progresses to a certain degree, the ball 330 bumps against the outer member 122 and the inner member 124 due to partial abrasion so that effectiveness in transferring steering force through normal rolling frictional movement is reduced. As a result, the roller 340 increases durability.

Figure 6:
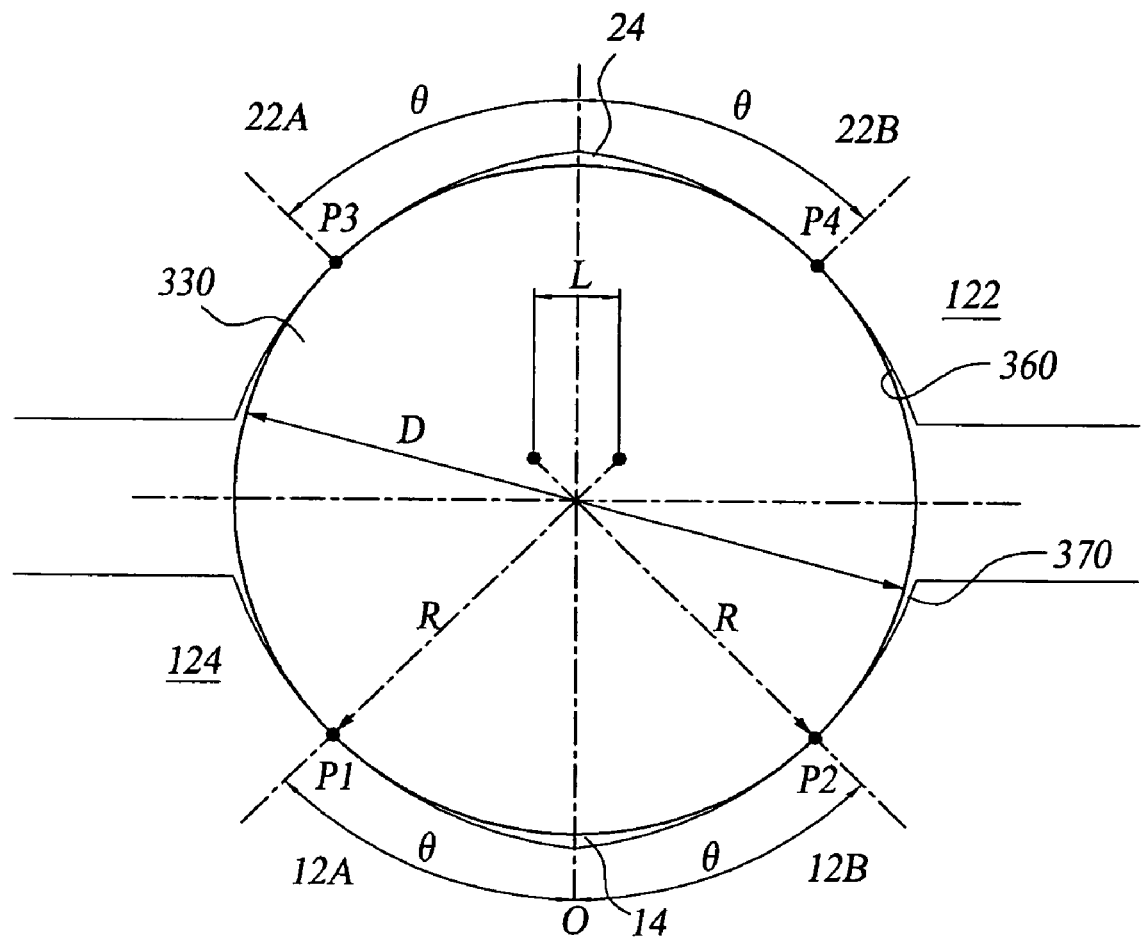
FIG. 6 is a sectional view showing a basic concept that a ball of a slip joint according to the present invention makes contact with four points.

Meanwhile, the ball 330 included in the slip joint 120 according to the present invention makes contact with four points within the second assembling recess 370 of the inner member 124 and the first assembling recess 360 of the outer member 122. FIG. 6 is a sectional view showing a basic concept that the ball of the slip joint according to the present invention makes contact with four points.

That is, in a case where the ball 330 is positioned within the second assembling recess 370 of the inner member 124, if the semi-circular section of the second assembling recess 370 is divided into two half parts, based on center line 0 in a radius direction of the second assembling recess 370 which extends though the center of the ball 330, left part 12A of the second assembling recess 370, which is positioned at a left side based on FIG. 6, makes contact with the ball 330 at point P1, and right part 12B of the second assembling recess 370, which is positioned at a right side based on FIG. 6, makes contact with the ball 330 at point P2.

The left part 12A and right part 12B of the second assembling recess 370 have each radius of curvature R a little larger than semi-diameter D/2 of the ball 330. It is preferable that the radius of curvature R is within the range of 50.1%~59.9% of the diameter D, and it is most preferable that the radius of curvature R is within a range of 52%~53% of the diameter D.

Similarly, in a case where the ball 330 is also positioned within the first assembling recess 360 of the outer member 122, if the semi-circular section of the first assembling recess 360 is divided into two half parts, based on center line 0 in a radius direction of the first assembling recess 360 which extends though the center of the ball 330, left part 22A of the first assembling recess 360, which is positioned at a left side based on FIG. 6, makes contact with the ball 330 at point P3, and right part 22B of the first assembling recess 360, which is positioned at a right side based on FIG. 6, makes contact with the ball 330 at point P4.

Also, the left part 22A and the right part 22B of the first assembling recess 360 have each radius of curvature R a little larger than semi-diameter D/2 of the ball 330. It is preferable that the radius of curvature R is within the range of 50.1%~59.9% of the diameter D of the ball 330, and it is most preferable that the radius of curvature R is within a range of 52%~53% of the diameter D.

As such, each half part of the semi-circular section of the first assembling recess 360 and the second assembling recess 370 has the radius of curvature R a little larger than the semi-diameter D/2 of the ball 330 so that gaps 14 and 24 are formed between the first and second assembling recesses 360 and 370 and the spherical surface of the ball 330.

Also, contact angle θ between the center line O and the point P1 where the ball 330 makes contact with the left part 12A of the second assembling recess 370 of the inner member 124 is equal to contact angle θ between the center line O and the point P2 where the ball 330 makes contact with the right part 12B of the second assembling recess 370. The contact angle θ is preferably 45 degrees.

Similarly, contact angle θ between the center line O and the point P3 where the ball 330 makes contact with the left part 22A of the first assembling recess 360 of the outer member 122 is equal to contact angle a between the center line O and the point P4 where the ball 330 makes contact with the right part 22B of the first assembling recess 360. The contact angle θ is preferably 45 degrees.

At this time, distance L between centers of the radiuses of curvature R of the left and right parts of the first assembling recess 360 or the second assembling recess 370 may be obtained through equation 2 sin 45(R−D/2).

As such, in the slip joint 120 including the ball 330 making contact with four points, the half parts of each semi-circular section of the first assembling recess 360 and the second assembling recess 370 have each radius of curvature R larger than the semi-diameter D/2 of the ball 330. Therefore, the number of contact points between the ball 330 and the outer member 122 and the inner member 124 decreases so that frictional resistance is reduced. As a result, it is always possible to achieve smooth rotation of the ball 330.

Again, referring to FIG. 4, in order to allow the rib 325, which has a hollow cylindrical shape and has a C-shaped section having one side cut out in an axial direction, to be inserted into the first assembling recess 360 of the outer member 122 and the second assembling recess 370 of the inner member 124 without clearance, the elastic part 320 of the slip bush 300 has a diameter larger than a diameter formed by the inner circumferential surfaces of the first assembling recess 360 and the second assembling recess 370 in a state before elastic force is applied to the elastic part.

That is, when the slip bush 300 is inserted into and assembled with the outer member 122 and the inner member 124, the rib 325 having the C-shaped section is assembled while bending towards a cut-out part of the elastic part 320. Then, the rib 325 makes close contact with the first assembling recess 360 and the second assembling recess 370 without clearance while the rib 325 is restored by elastic force, thereby removing a rattling noise due to clearance.

According to the detail description and the accompanying drawings in the present embodiment, the balls 330 and the rollers 340 are arranged in the sequence of ball-roller-ball. However, it is not necessary that the arrangement is limited to this. As the case may be, they can be also arranged in the sequence of roller-ball-roller. Also, the number of the balls 330 and the number of the rollers 340 can be variously combined with each other in arranging them.

Figure 7:
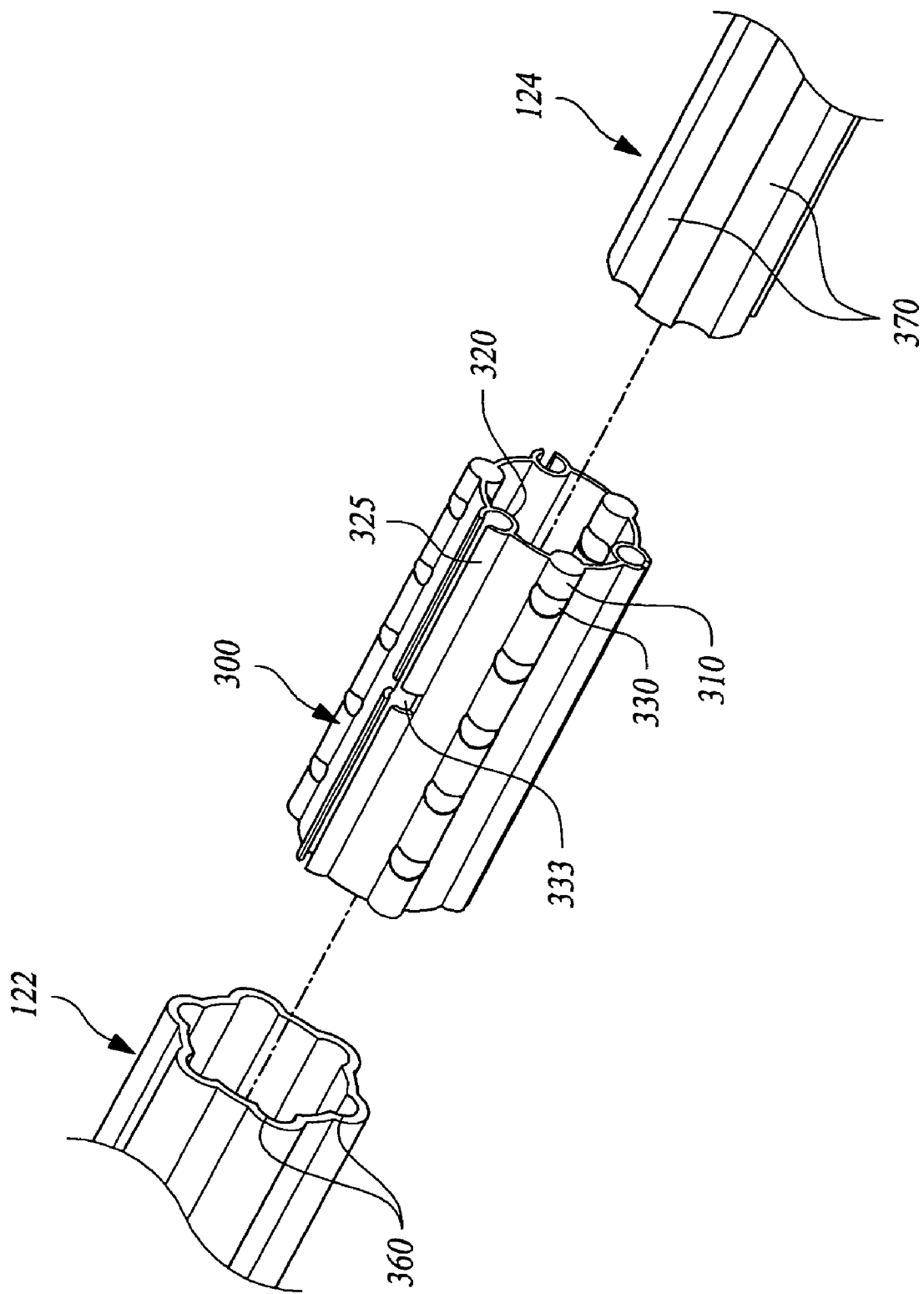
FIG. 7 is an exploded perspective view of a slip joint of a steering apparatus for a vehicle according to the second embodiment of the present invention.
Figure 8:
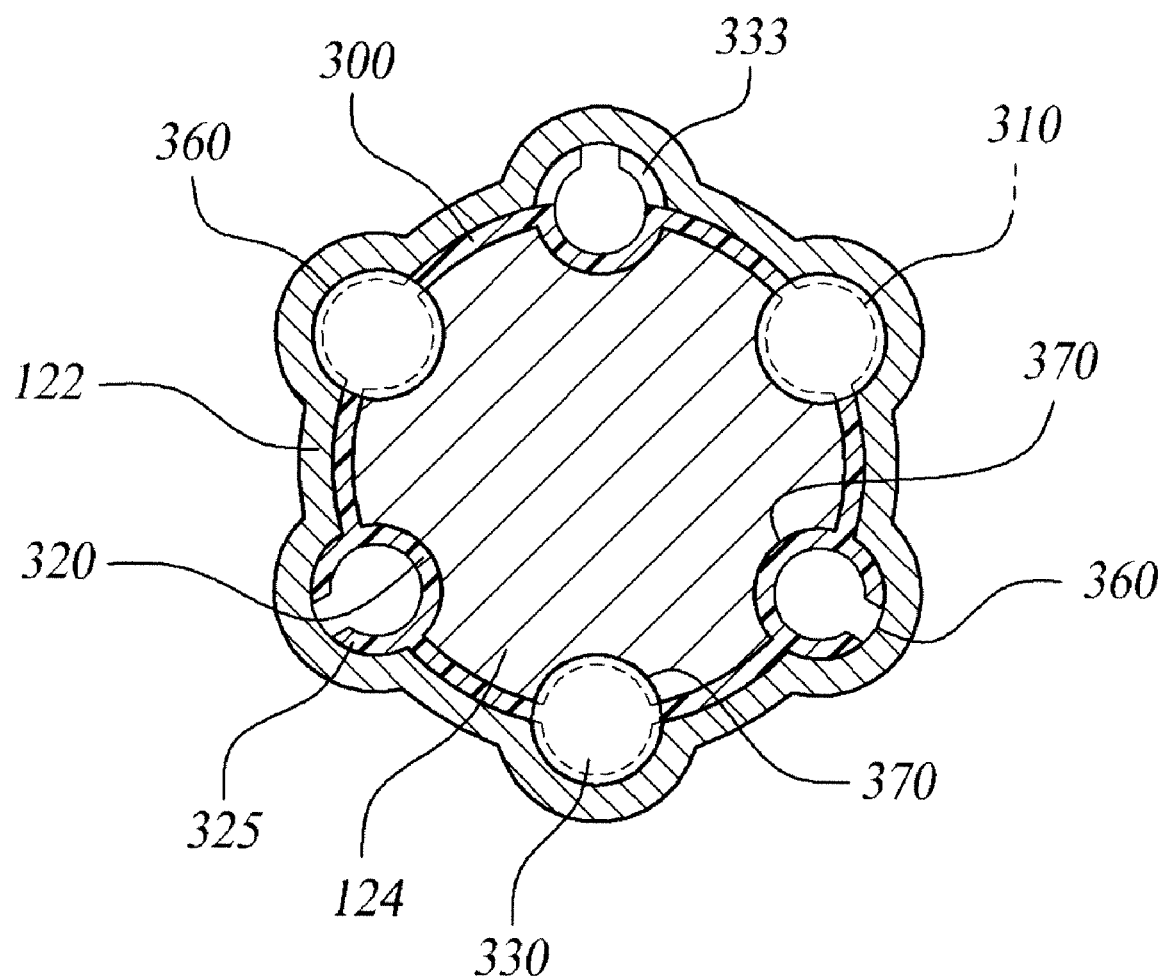
FIG. 8 is a sectional view of a slip joint of a steering apparatus for a vehicle according to the second embodiment of the present invention.

FIG. 7 is an exploded perspective view of a slip joint of a steering apparatus for a vehicle according to the second embodiment of the present invention, and FIG. 8 is a sectional view of the slip joint of the steering apparatus for a vehicle according to the second embodiment of the present invention.

As shown in FIGS. 7 and 8, the slip joint of the steering apparatus for a vehicle according to the second embodiment of the present invention includes an inner member 124 having a plurality of second assembling recesses 370 formed on an outer circumferential surface thereof while having a long shape formed in an axial direction; an outer member 122 having a plurality of first assembling recesses 360, which are formed on an inner circumferential surface thereof while corresponding to the second assembling recesses 370 and have a long shape formed in an axial direction, the inner member 124 being inserted into the outer member 122; and a slip bush 300, which has a cylindrical shape having a hollow interior and is inserted between the outer member 122 and the inner member 124, the slip bush 300 having elastic parts 320 and mounting parts 310 formed on a circumferential surface of the slip bush along an axial direction in such a manner that they are spaced from each other, the elastic parts 320 and the mounting parts 310 being inserted between the second assembling recesses 370 and the first assembling recesses 360. Each elastic part 320 has a cylindrical shape having a hollow interior, and has a rib 325 having curved surfaces formed in such a manner that one side surface of the elastic part is cut out in the axial direction. A cutting part 333 is formed on at least one portion of the elastic part in the axial direction in such a manner that a portion of the rib 325 is cut out. Each mounting part 310 has a long and cylindrical shape, and includes at least one ball 330 which is pressed and inserted into the mounting part while extending through an inner circumferential surface and an outer circumferential surface of the mounting part so as to perform a rolling movement within the second assembling recesses 370 and the first assembling recesses 360.

The slip joint of a steering apparatus for a vehicle according to the second embodiment of the prevent invention has a structure, which prevents clearance due to abrasion so as to prevent a rattling noise, and also improves assembling effectiveness by reducing assembling load even when lengths of the inner member 124, the outer member 122 and the slip bush 300 increase so as to improve rigidity and durability of the slip bush 300.

The slip joint has a structure where rotational force is transferred when a driver operates a steering wheel, and simultaneously, the inner member 124 and the outer member 122 are retracted and protracted so as to achieve extension and contraction of the slip joint in an axial direction.

The inner member 124 has a plurality of second assembling recesses 370 formed on an outer circumferential surface thereof, and the second assembling recesses have a long recess-shape in an axial direction. The outer member 122 has a plurality of first assembling recesses 360 formed on an inner circumferential surface thereof while corresponding to the second assembling recesses, and the first assembling recesses have a long recess-shape in an axial direction.

The slip bush 300 is inserted and assembled between the inner member 124 and the outer member 122. The slip bush 300 has a hollow cylindrical shape, and has the elastic parts 320 and the mounting parts 310, which are inserted into the second assembling recesses 370 of the inner member 124 and the first assembling recesses 360 of the outer member 122.

The elastic parts 320 and the mounting parts 310 are formed on the circumferential surface of the slip bush 300 in such a manner that they are spaced from each other. The elastic parts 320 remove clearance between the inner member 124 and the outer member 122. Each ball 330 of the slip bush 300 allows retraction and protraction in an axial direction of the slip bush to be easily achieved while delivering rotational force of the steering shaft.

Each ball 330 of such slip bush 300 is pressed and inserted into each mounting part 310 while extending through the inner circumferential surface and the outer circumferential surface of the mounting part, and is assembled so as to perform a rolling movement within the second assembling recess 370 of the inner member 124 and the first assembling recess 360 of the outer member 122. The ball may be made from steel, and may be also made from engineering plastic material having rigidity and an abrasion-proof property in consideration of reduction of weight and cost, etc.

Moreover, the ball 330 makes contact with four points within the second assembling recess 370 of the inner member 124 and the first assembling recess 360 of the outer member 122. Herein, the description of this is omitted because this has been already described in detail with reference to FIG. 6. Only the fact that each ball also makes contact with four points in the slip joint according to the second embodiment of the present invention is described.

The elastic part 320 of the slip bush 300 has a cylindrical shape having a hollow interior and is inserted and seated into the first assembling recess 360 and the second assembling recess 370. The elastic part 320 has the rib 325 which has a C-shaped section and is formed in such a manner that one side surface of the elastic part is cut out in the axial direction. Therefore, elastic force of the elastic part 320 widens the elastic part 320 radially outward, thereby removing the clearance between the inner member 124 and the outer member 122.

Moreover, the elastic part 320 includes the cutting part 333 formed in such a manner that at least one portion of the rib 325 is cut out in the axial direction so that assembling load can be reduced when the slip bush 300 is assembled with the inner member 124 and the outer member 122.

Particularly, considering the structure of the vehicle, in a case where the slip joint of the steering apparatus becomes longer, the lengths of the inner member 124 and the outer member 122 become longer. Therefore, torsion of the shaft, which is caused by manufacturing tolerances, and bending force generate so that the assembling load increases when the slip bush 300 is assembled. At this time, the cutting part 333 of the elastic part 320 can reduce the assembling load.

In FIGS. 7 and 8, although the number of the cutting part 333 included in the elastic part 320 is one, the number of cutting parts is not limited to one. This is only one example so that at least one cutting part 333 may be included in respective elastic parts 320.

Therefore, if positions and sizes of the cutting parts 333 and the number thereof are adjusted according to need when the slip bush 300 is assembled, the assembling load of the slip bush 300 can be variously adjusted.

Figure 9:
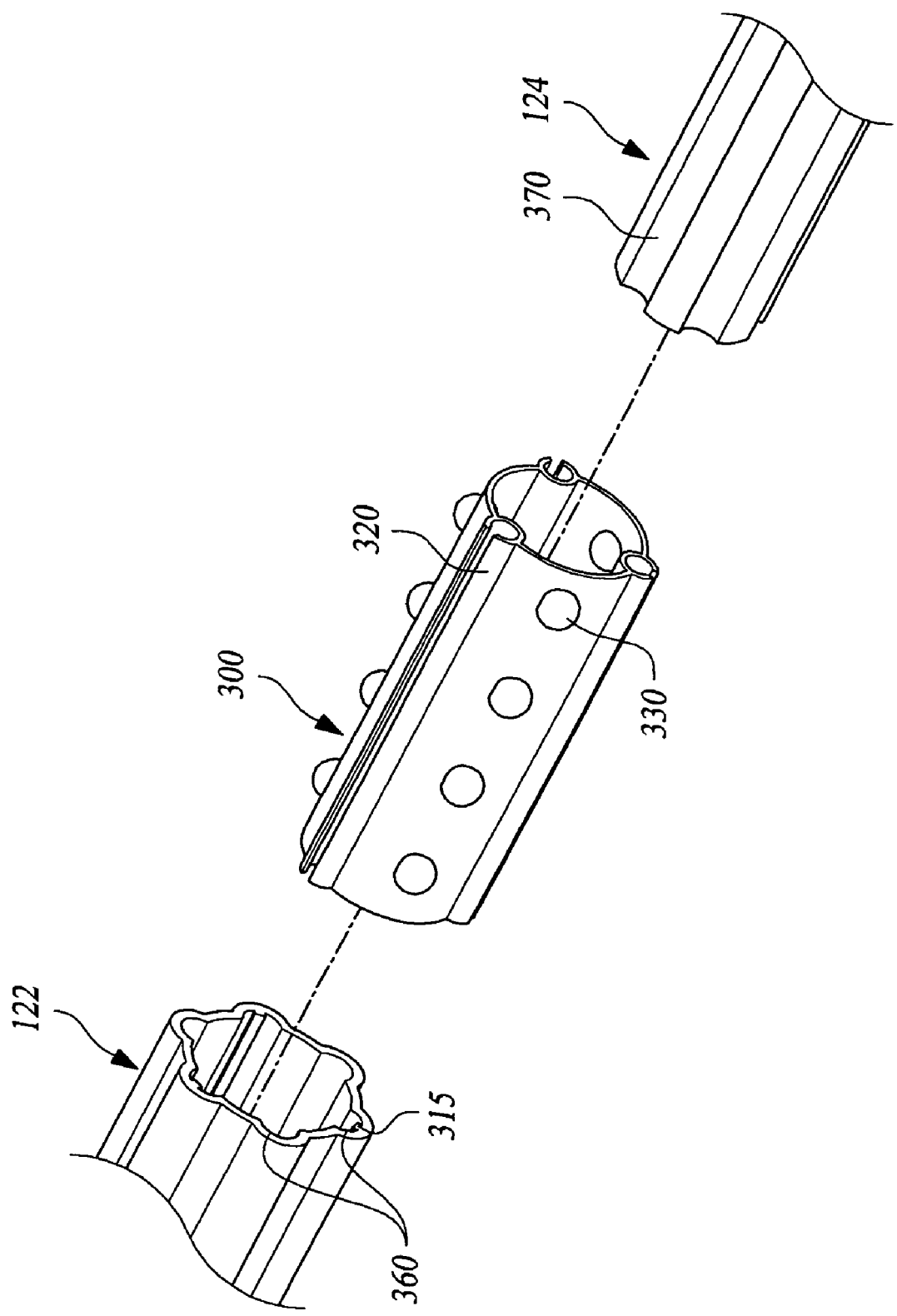
FIG. 9 is an exploded perspective view of a slip joint of a steering apparatus for a vehicle according to the third embodiment of the present invention.
Figure 10:
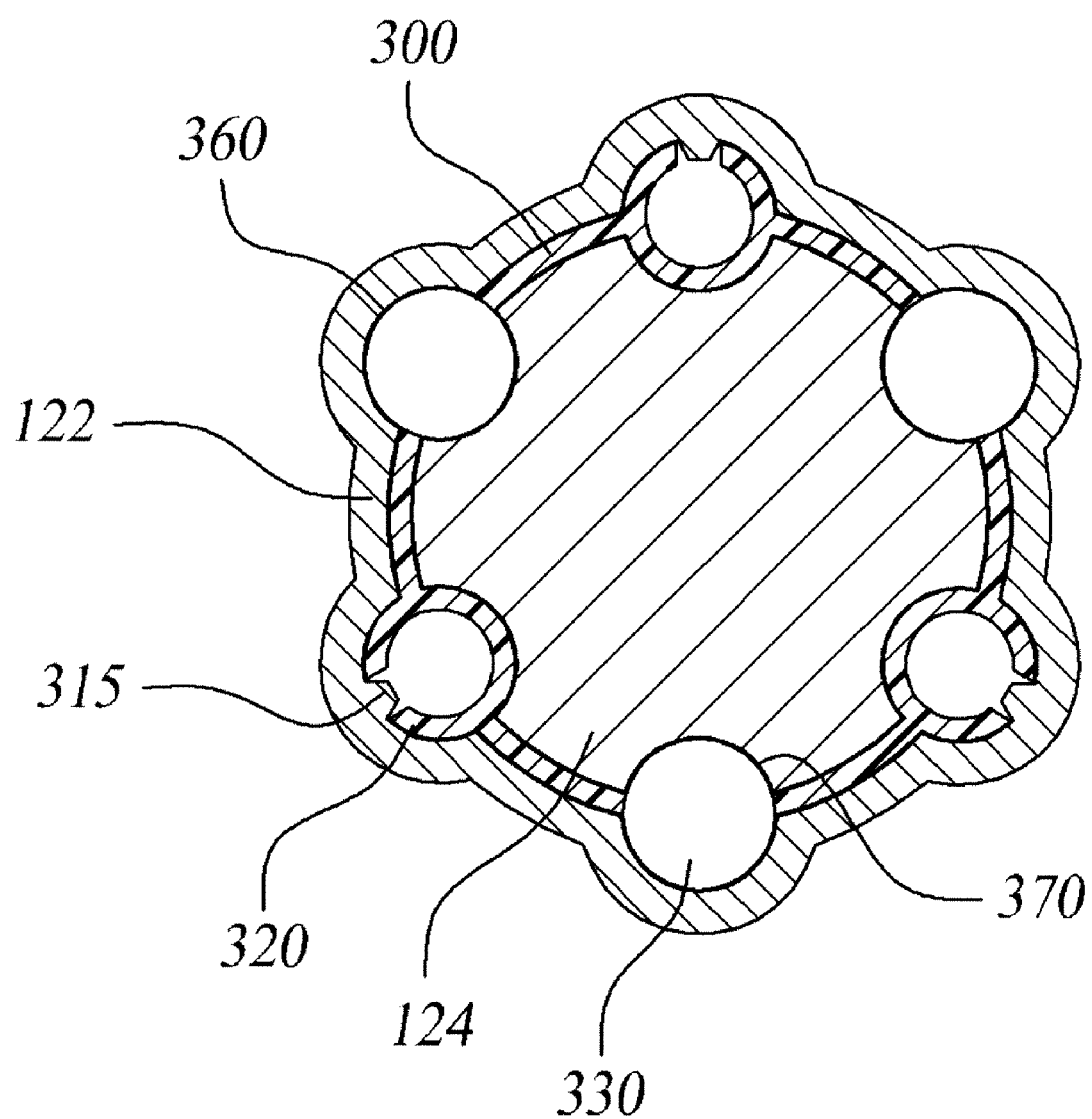
FIG. 10 is a sectional view of a slip joint of a steering apparatus for a vehicle according to the third embodiment of the present invention.

FIG. 9 is an exploded perspective view of a slip joint of a steering apparatus for a vehicle according to the third embodiment of the present invention, and FIG. 10 is a sectional view of the slip joint of a steering apparatus for a vehicle according to the third embodiment of the present invention.

As shown in FIGS. 9 and 10, the slip joint of the steering apparatus for a vehicle according to the third embodiment of the present invention includes an inner member 124 having a plurality of second assembling recesses 370 formed on an outer circumferential surface thereof while having a long shape formed in an axial direction; an outer member 122 allowing the inner member 124 to be inserted thereinto, the outer member having a plurality of first assembling recesses 360, which are formed on an inner circumferential surface thereof while corresponding to the second assembling recesses 370 and have a long shape formed in an axial direction, and protrusions 315, which protrude from the inner circumferential surfaces of the first assembling recesses 360 while having a long shape formed in an axial direction; and a slip bush 300, which has a cylindrical shape having a hollow interior and is inserted between the outer member 122 and the inner member 124, including elastic parts 320 of a cylindrical shape having a hollow interior, the elastic parts being inserted between the second assembling recess 370 and the first assembling recess 360 and having parts cut out in an axial direction correspondingly to each protrusion 315, so as to allow the protrusion 315 of the outer member 122 to be inserted therein, the slip bush 300 also including balls 330 to be seated on the second assembling recess 370 and the first assembling recess 360, the balls being pressed and inserted into the slip bush 300 while extending through an outer circumferential surface and an outer circumferential surface of the slip bush between elastic parts 320.

The slip joint of the steering apparatus for a vehicle according to the third embodiment has a structure in which the slip bush 300 removes clearance between the inner member 124 and the outer member 122 so as to reduce a rattling noise, and simultaneously increases torsional rigidity in operating the steering wheel, thereby improving operational feeling and steering stability.

The slip joint has a structure where rotational force is transferred in operating the steering wheel, and simultaneously, the inner member 124 and the outer member 122 are retracted and protracted so as to allow extension and contraction of the slip joint in an axial direction to be achieved.

The inner member 124 has a plurality of the second assembling recesses 370 formed on an outer circumferential surface thereof while having a long recess-shape in an axial direction. The outer member 122 has a plurality of first assembling recesses 360 formed on an inner circumferential surface thereof while corresponding to the second assembling recesses, and the first assembling recesses have a long recess-shape in an axial direction.

Also, a protrusion 315 is formed on some of the first assembling recesses 360 in such a manner that it protrudes from the inner circumferential surfaces thereof while having a long shape in an axial direction. The protrusion 315 has a slated shape having a width which becomes narrower toward the slip bush 300 so as to allow the outer member to be easily assembled with the slip bush 300.

The slip bush 300 is inserted and assembled between the inner member 124 and the outer member 122. Each ball 330 of the slip bush 300 delivers rotational force of the steering shaft and simultaneously allows retraction and protraction of the slip bush in an axial direction to be easily achieved. The elastic parts 320 of the slip bush 300 remove clearance between the inner member 124 and the outer member 122 by elastic force.

The ball 330 of this slip bush 300 is pressed and inserted into the elastic part 320 while extending through the outer and inner circumferential surfaces of the slip bush between elastic parts. The ball is inserted into and assembled with the second assembling recess 370 of the inner member 124 and the first assembling recess 360 of the outer member 122. Although the ball can be made from steel, the ball is made from engineering plastic material having rigidity and an abrasion-proof property in consideration of reduction of weight and cost, etc.

Also, the ball 330 makes contact with four points within the second assembling recess 370 of the inner member 124 and the first assembling recess 360 of the outer member 122. Herein, the description of this is omitted because this has been already described in detail with reference to FIG. 6. Only the fact that each ball also makes contact with four points in the slip joint according to the third embodiment is described.

The elastic part 320 of the slip bush 300 has a cylindrical shape having a hollow interior and is inserted into and seated on the first assembling recess 360 and the second assembling recess 370. The elastic part 320 has a shape formed in such a manner that a part corresponding to the protrusion 315 is cut out in an axial direction so as to allow the protrusion 315 of the outer member 122 to be inserted through the cut-out part As such, due to the cut-out part of the elastic part 320, elastic force of the elastic part 230 widens the elastic part 320 radially outward, thereby removing the clearance between the inner member 124 and the outer member 122. However, the cut-out part of the elastic part 320 may weaken torsional rigidity against rotation.

Therefore, the protrusion 320 of the outer member 122 is inserted into the cut-out part of the elastic part 320 so as to support the cut-out part, thereby improving torsional rigidity of the slip bush 300.

Figure 11:
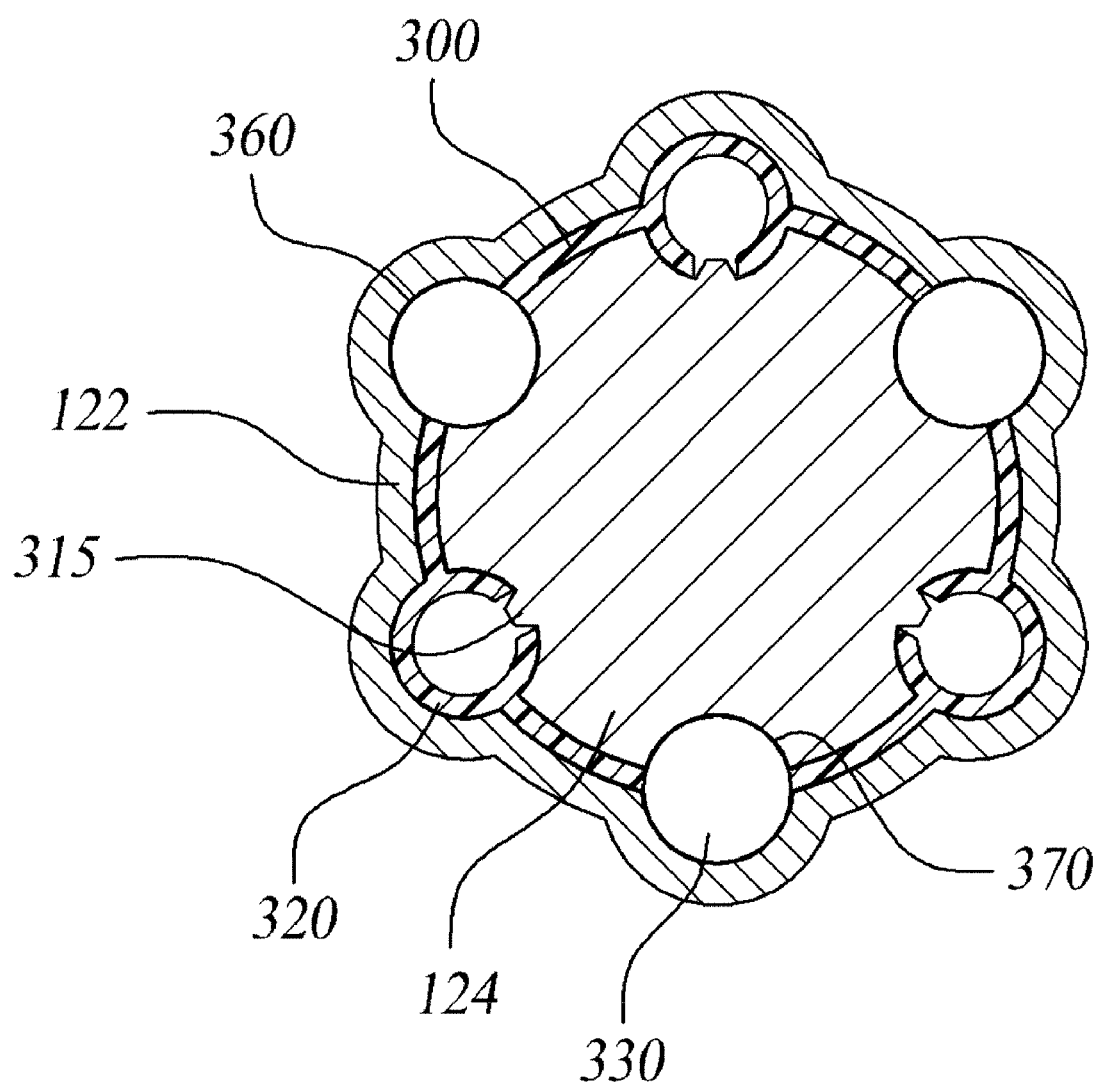
FIG. 11 is a sectional view of a slip joint of a steering apparatus for a vehicle according to the fourth embodiment of the present invention.

FIG. 11 is a sectional view of a slip joint of a steering apparatus for a vehicle according to the fourth embodiment of the present invention.

As shown, the slip joint of a steering apparatus for a vehicle according to the fourth embodiment of the present invention includes an inner member 124 having a plurality of second assembling recesses 370, which are formed on an outer circumferential surface thereof while having a long shape formed in an axial direction, and protrusions 315, which protrude from the inner circumferential surfaces of the second assembling recesses 370 while having a long shape formed in an axial direction; an outer member 122 allowing the inner member 124 to be inserted thereinto, the outer member having a plurality of first assembling recesses 360, which are formed on an inner circumferential surface thereof while corresponding to the second assembling recesses 370 and have a long shape formed in an axial direction; and a slip bush 300, which has a cylindrical shape having a hollow interior and is inserted between the outer member 122 and the inner member 124, including elastic parts 320 of a cylindrical shape having a hollow interior, the elastic part being inserted between the second assembling recess 370 and the first assembling recess 360 and having parts cut out in an axial direction correspondingly to each protrusion 315, so as to allow the protrusion 315 of the inner member 124 to be inserted therein, the slip bush 300 also including balls 330 to be seated on the second assembling recess 370 and the first assembling recess 360, the balls being pressed and inserted into the slip bush 300 while extending through an outer circumferential surface and an outer circumferential surface of the slip bush between elastic parts 320.

Differently from the third embodiment, in the slip joint of the steering apparatus for a vehicle according to the fourth embodiment, each protrusion 315 is formed on inner circumferential surface of some of the second assembling recesses 370 of the inner member 124, and each elastic part 320 has a cut-out part formed in such a manner that a part is cut out so as to allow the protrusion 315 of the inner member 124 to be inserted through the cut-out part. As such, even in a case where the protrusion 315 of the inner member 124 supports the cut-out part of the elastic part 320, an effect equal to the effect obtained in the third embodiment can be obtained.

Moreover, the ball 330 make contact with four points within the second assembling recess 370 of the inner member 124 and the first assembling recess 360 of the outer member 122. Herein, the description of this is omitted because this has been already described in detail with reference to FIG. 6. Only the fact that each ball also makes contact with four points in the slip joint according to the fourth embodiment is described.

The above description is only illustrative purposes. Those skilled in the art will appreciate that various modifications, additions and substitutions are possible, without departing from an inherent characteristic of the invention.

Particularly, the described embodiments can create a new configuration and effect, respectively, or in such a manner that at least two embodiments are combined.

For example, there can be an embodiment obtained by combining the structure according to the first embodiment, in which the ball 330 is pressed and inserted into the first mounting hole 335 of the slip bush 300, and the roller 340 of a cylindrical shape is pressed and inserted into the second mounting hole 345 of the slip bush 300 so that they transfer steering force between the inner member 124 and the outer member 122, with the structure according to the second embodiment, in which the cutting part 333 is formed on at least one portion of the rib 325 cut out in an axial direction of the elastic part 320. In such a combined embodiment, the principle where the ball makes contact with four points can be also applied in the same manner.

Also, there can be another embodiment obtained by combining the structure according to the first embodiment, in which the ball 330 is pressed and inserted into the first mounting hole 335 of the slip bush 300, and the roller 340 of a cylindrical shape is pressed and inserted into the second mounting hole 345 of the slip bush 300 so that they transfer steering force between the inner member 124 and the outer member 122, with the structure according to the third embodiment, in which the protrusion 315 of the outer member 122 is inserted into the cut-out part of the elastic part 320 so as to support the cut-out part, or with the structure according to the fourth embodiment, in which the protrusion 315 of the inner member 124 is inserted into the cut-out part of the elastic part 320 so as to support the cut-out part. In such combined embodiments. Of course, the principle that the ball makes contact with four points can be also applied in the same manner.

Also, there can be another embodiment obtained by combining the structure according to the first embodiment, in which the ball 330 is pressed and inserted into the first mounting hole 335 of the slip bush 300, and the roller 340 of a cylindrical shape is pressed and inserted into the second mounting hole 345 of the slip bush 300 so that they transfer steering force between the inner member 124 and the outer member 122, with the structure according to the second embodiment, in which the cutting part 333 is formed on at least one portion of the rib 325 cut out in an axial direction of the elastic part 320 and the structure according to the third embodiment, in which the protrusion 315 of the outer member 122 is inserted into the cut-out part of the elastic part 320 so as to support the cut-out part.

Alternatively, there can be another embodiment obtained by combining the structure according to the first embodiment, in which the ball 330 is pressed and inserted into the first mounting hole 335 of the slip bush 300, and the roller 340 of a cylindrical shape is pressed and inserted into the second mounting hole 345 of the slip bush 300 so that they transfer steering force between the inner member 124 and the outer member 122, with the structure according to the second embodiment, in which the cutting part 333 is formed on at least one portion of the rib 325 cut out in an axial direction of the elastic part 320 and the structure according to the fourth embodiment, in which the protrusion 315 of the inner member 124 is inserted into the cut-out part of the elastic part 320 so as to support the cutting part.

Of course, in these combined embodiments, the principle that the ball makes contact with four points can be also applied in the same manner.

According to the present invention, even when a ball disposed between an inner member and an outer member of a slip joint is worn away or damaged due to abrasion, an elastic part can transfer power while compensating for clearance so that a rattling noise generated due to clearance can be removed, and steering stability and durability of the slip joint can be improved by increasing torsional rigidity of a slip bush.

In addition, because the ball makes contact with four points, resistance caused by friction is reduced so that the slip bush can be easily assembled with the apparatus when it is installed at the apparatus. Also, external displacement, such as reverse input load generated in operation the apparatus, etc., can be sufficiently absorbed. Particularly, although deformation is generated due to occurrence of errors in manufacturing measurement or change of a straightness degree, there is an advantage in that a superior sliding performance can be always secured.

Therefore, embodiments of the present invention have not been described for limiting purposes so that the scope and spirit of the invention is not limited by the embodiments thereof. Accordingly, the scope of the invention is not to be limited by the above embodiments but by the claims and the equivalents thereof.

What is claimed is:

1. A slip joint of a steering apparatus for a vehicle, the slip joint comprising:
    an outer member having a plurality of first assembling recesses formed on an inner circumferential surface of the outer member in an axial direction;
    an inner member being inserted within the outer member, the inner member having a plurality of second assembling recesses formed on an outer circumferential surface of the inner member in an axial direction; and
    a slip bush, which has a hollow cylindrical shape and is inserted between the outer member and the inner member, the slip bush including mounting parts having balls and at least one roller inserted within the mounting parts to transfer steering force, each mounting part extending along an axial direction and having a circular or elliptical bar-shape, and having a plurality of first mounting holes and a second mounting hole. the first mounting holes having spherical shape and extending through outer and inner circumferential surfaces of the mounting part so as to allow the balls to be pressed and inserted into the first mounting holes, the second mounting hole extending through the outer and inner circumferential surfaces of the mounting part so as to allow the roller to be pressed and inserted into the second mounting hole,
    wherein at least one end of the slip bush includes the circular or elliptical bar-shape.

2. The slip joint as claimed in claim 1, wherein each roller has a section of a circular shape, which has a diameter smaller than a diameter of each ball.

3. The slip joint as claimed in claim 1, wherein each first mounting hole has a spherical shape and includes a first outer circumference hole extending through an outer circumferential surface of the slip bush and a first inner circumference hole extending through an inner circumferential surface of the slip bush, and
    the second mounting hole has a cylindrical shape and includes a second outer circumference hole extending through the outer circumferential surface of the slip bush and a second inner circumference hole extending through the inner circumferential surface of the slip bush,
    wherein the first outer circumference hole is larger than the first inner circumference hole and the second outer circumference hole is larger than the second inner circumference hole.

4. The slip joint as claimed in claim 1 wherein each ball makes contact with two points within the first assembling recesses of the outer member and makes contact with two points within the second assembling recesses of the inner member.

5. The slip joint as claimed in claim 4, wherein, if each semi-circular section of the first assembling recess and the second assembling recess is divided into two half parts based on each center line extending through a center of each ball in radius directions of the first assembling recess and the second assembling recess, the half parts of each semi-circular section of the first assembling recess and the second assembling recess have a radius of curvature larger than a diameter of each ball.

6. The slip joint as claimed in claim 5, wherein a contact angle between the center line and a contact point where the half part of the semi-circular section of the first assembling recess makes contact with the ball is equal to a contact angle between the center line and a contact point where the half part of the semi-circular section of the second assembling recess makes contact with the ball.

7. The slip joint as claimed in claim 1, wherein the slip bush further includes elastic parts having a hollow cylindrical shape and having one side cut out in an axial direction.

8. The slip joint as claimed in claim 1, wherein recesses are formed at both sides of the second mounting hole in the axial direction, and a boss is formed at both sides of the roller in such a manner that it protrudes therefrom so as for the boss to be pressed and inserted into the recess, and for the roller to be supported by inner walls of the second mounting hole while rotating about the boss as an axis.

9. The slip joint as claimed in claim 1, wherein the slip bush is made from nylon or plastic material.

* * * * *